(12) United States Patent
Yaguchi et al.

(10) Patent No.: US 7,895,835 B2
(45) Date of Patent: Mar. 1, 2011

(54) EXHAUST HEAT RECOVERY APPARATUS

(75) Inventors: Hiroshi Yaguchi, Susono (JP); Daisaku Sawada, Gotenba (JP); Shinichi Mitani, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 309 days.

(21) Appl. No.: 11/715,470

(22) Filed: Mar. 8, 2007

(65) Prior Publication Data

US 2007/0209359 A1 Sep. 13, 2007

(30) Foreign Application Priority Data

Mar. 9, 2006 (JP) ................................. 2006-064489

(51) Int. Cl.
*F01B 29/10* (2006.01)
*F02G 1/04* (2006.01)

(52) U.S. Cl. ................. 60/520; 60/524; 60/526; 60/285; 60/517

(58) Field of Classification Search ............ 60/517–530, 60/613–624
See application file for complete search history.

(56) References Cited

U.S. PATENT DOCUMENTS

| | | | |
|---|---|---|---|
| 5,146,750 A * | 9/1992 | Moscrip | 60/517 |
| 6,450,283 B1 * | 9/2002 | Taggett | 180/304 |
| 6,543,229 B2 * | 4/2003 | Johansson | 60/605.1 |
| 6,651,433 B1 * | 11/2003 | George, Jr. | 60/618 |
| 7,181,912 B2 * | 2/2007 | Mori | 60/616 |
| 2005/0194940 A1 | 9/2005 | Aldridge et al. | |

FOREIGN PATENT DOCUMENTS

| | | |
|---|---|---|
| EP | 1 243 758 | 9/2002 |
| EP | 1243758 A1 * | 9/2002 |
| JP | 57-188902 | 11/1982 |
| JP | 02 157423 | 6/1990 |
| JP | 05-038956 | 2/1993 |
| JP | 2003-518458 | 6/2003 |
| JP | 2004-332665 | 11/2004 |
| JP | 2005-090376 | 4/2005 |
| JP | 2005-113719 | 4/2005 |
| WO | WO 90/09515 | 8/1990 |

OTHER PUBLICATIONS

International Search Report and Written Opinion dated Jul. 5, 2007.
Notification of Reason(s) for Refusal for JP Appl. No. 2006-064489 dated Sep. 21, 2010.

\* cited by examiner

*Primary Examiner* — Thomas E Denion
*Assistant Examiner* — Jesse Bogue
(74) *Attorney, Agent, or Firm* — Finnegan, Henderson, Farabow, Garrett & Dunner, LLP

(57) ABSTRACT

An exhaust heat recovery apparatus includes: an exhaust heat recovery unit that produces motive power by recovering thermal energy from exhaust heat, wherein the produced motive power is combined with motive power produced by a heat engine and is output together therewith; an auxiliary that is driven by at least the exhaust heat recovery unit; and a power transmission-switching device that is provided between the heat engine and the exhaust heat recovery unit, the same power transmission-switching device being provided between the heat engine and the auxiliary, and that cuts off the connection between the heat engine and the exhaust heat recovery unit when there is no request to drive the heat engine. Thus, it becomes possible to effectively use the surplus motive power produced by the exhaust heat recovery unit when there is no request to drive the heat engine.

22 Claims, 9 Drawing Sheets

EXHAUST HEAT RECOVERY APPARATUS

INCORPORATION BY REFERENCE

The disclosure of Japanese Patent Application No. 2006-064489 filed on Mar. 9, 2006 including the specification, drawings and abstract is incorporated herein by reference in its entirety.

BACKGROUND OF THE INVENTION

1. Field of the Invention

The present invention relates to an exhaust heat recovery apparatus that recovers thermal energy from the exhaust gas of an internal combustion engine, factory exhaust heat, or the like to produce motive power.

2. Description of the Related Art

An exhaust heat recovery apparatus is available that, using a heat engine, recovers the exhaust heat from an internal combustion engine that is mounted on a vehicle, such as a passenger car, a bus and a truck. In the exhaust heat recovery apparatus used for such a purpose, an external combustion engine is used, such as the Stirling engine, which is excellent in theoretical thermal efficiency, for example.

Japanese Patent Application Publication No. 2004-332665 (JP-A-2004-332665) discloses a technology concerning a system that includes a combustion engine, an auxiliary, an electric generator, and a Stirling engine for driving the electric generator, wherein the electric power generated by the electric generator is supplied to a motor and a battery, and the auxiliary is driven by the motor, wherein, a clutch is provided between the auxiliary and the combustion engine, and the auxiliary is driven by the combustion engine or the motor in a selective manner using the clutch. In addition, Published Japanese Translation of PCT application No. 2003-518458 (JP-T-2003-518458) discloses a technology in which a clutch is provided between the internal combustion engine and the Stirling engine, and the Stirling engine is used as an additional drive unit of the internal combustion engine.

In the meantime, if the thermal energy recovered by the exhaust heat recovery unit is output as electric energy, the thermal energy recovered by the exhaust heat recovery unit declines because the energy conversion efficiency of motors and batteries is less than 100%. Moreover, the energy conversion efficiency of motors and batteries is less than the transmission efficiency achieved when a mechanical transmission means, such as gears and chains, is used.

In view of effective use of energy, as described in JP-T-2003-518458, it is preferable that the thermal energy recovered by the exhaust heat recovery unit be converted into kinetic energy to produce motive power, and the motive power produced by the exhaust heat recovery unit and the motive power produced by the heat engine be output after being combined using a mechanical transmission means.

In external combustion engines, such as the Stirling engine, the heat input from a heat source, such as the exhaust gas, is transferred to the working fluid of the external combustion engine through a heat exchanger, and external combustion engines are therefore less responsive to the variation of the heat input. In addition, external combustion engines, such as the Stirling engine, which obtain thermal energy from a heat source through a heater, sometimes continue to produce motive power even after the heat input is stopped, by virtue of the heat stored in the heater.

As a result, if an external combustion engine, such as the Stirling engine, is used as the exhaust heat recovery unit, the exhaust heat recovery unit sometimes continues to produce motive power by virtue of the heat stored in the heater that the exhaust heat recovery unit includes, even when exhaust heat is not supplied to the exhaust heat recovery unit. In such a case, in the case of the configuration in which the output from the exhaust heat recovery unit and the output from the heat engine are output together, the exhaust heat recovery unit produces surplus motive power even when there is no request to drive the heat engine.

SUMMARY OF THE INVENTION

The present invention has been made in consideration of such circumstances. As an aspect of the present invention, provided is an exhaust heat recovery apparatus with which, when a configuration is adopted in which the motive power produced by the exhaust heat recovery unit and the motive power produced by the heat engine are combined, it is possible to effectively use surplus motive power produced by the exhaust heat recovery unit when there is no request to drive the heat engine.

Under the circumstances, provided is an exhaust heat recovery apparatus that includes: an exhaust heat recovery unit that produces motive power by recovering thermal energy from exhaust heat, wherein the produced motive power is combined with motive power produced by a heat engine and is output together therewith; an auxiliary that is driven by at least the exhaust heat recovery unit; and a power transmission-switching device that is provided between the heat engine and the exhaust heat recovery unit, the same power transmission-switching device being provided between the heat engine and the auxiliary, and that cuts off the connection between the heat engine and the exhaust heat recovery unit when there is no request to drive the heat engine.

In the exhaust heat recovery apparatus, the motive power produced by the exhaust heat recovery unit and the motive power produced by the heat engine are output after being combined. In addition, the exhaust heat recovery apparatus includes the auxiliary that is driven by at least the exhaust heat recovery unit, and the power transmission-switching device is provided between the heat engine and the exhaust heat recovery unit, the same power transmission-switching device being provided between the heat engine and the auxiliary. When there is no request to drive the heat engine, the connection between the heat engine and the auxiliary is cut off by the power transmission-switching device to drive the auxiliary using the exhaust heat recovery unit alone. Thus, when there is no request to drive the heat engine, it is possible to separate the heat engine and the exhaust heat recovery unit to drive the auxiliary using the exhaust heat recovery unit alone. Accordingly, when there is no request to drive the heat engine, it is possible to effectively use the surplus motive power produced by the exhaust heat recovery unit.

BRIEF DESCRIPTION OF THE DRAWINGS

The features, advantages thereof, and technical and industrial significance of this invention will be better understood by reading the following detailed description of preferred embodiments of the invention, when considered in connection with the accompanying drawings, in which.

DETAILED DESCRIPTION OF THE PREFERRED EMBODIMENTS

In the following description and the accompanying drawings, the present invention will be described in more detail with reference to exemplary embodiments. It should be noted that the present invention is not limited to the preferred embodiments (hereinafter referred to merely as "the embodiment(s)") for carrying out the invention. The components of the embodiments include ones that those skilled in the art would easily think of, and ones that are substantially the same as the former ones. The description given below illustrates a case where a Stirling engine is used as an exhaust heat recovery unit to recover thermal energy from the exhaust gas from an internal combustion engine, which functions as a heat engine. In addition to the Stirling engine, another exhaust heat recovery device, such as one using the Brayton cycle, may be used as the exhaust heat recovery unit. The type of heat engine is arbitrary.

A first embodiment is characterized in the following points. Specifically, the motive power produced by the exhaust heat recovery unit and the motive power produced by the heat engine are combined and output. In addition, an auxiliary driven by at least the exhaust heat recovery unit is provided, and a power transmission-switching means is provided between the heat engine and the exhaust heat recovery unit, the same power transmission-switching means being provided between the heat engine and the auxiliary. When there is no request to drive the heat engine, the connection between the heat engine and the auxiliary is cut off by the power transmission-switching means, and the exhaust heat recovery unit alone drives the auxiliary. First, a configuration of the exhaust heat recovery unit according to the first embodiment will be described.

Figure 1:
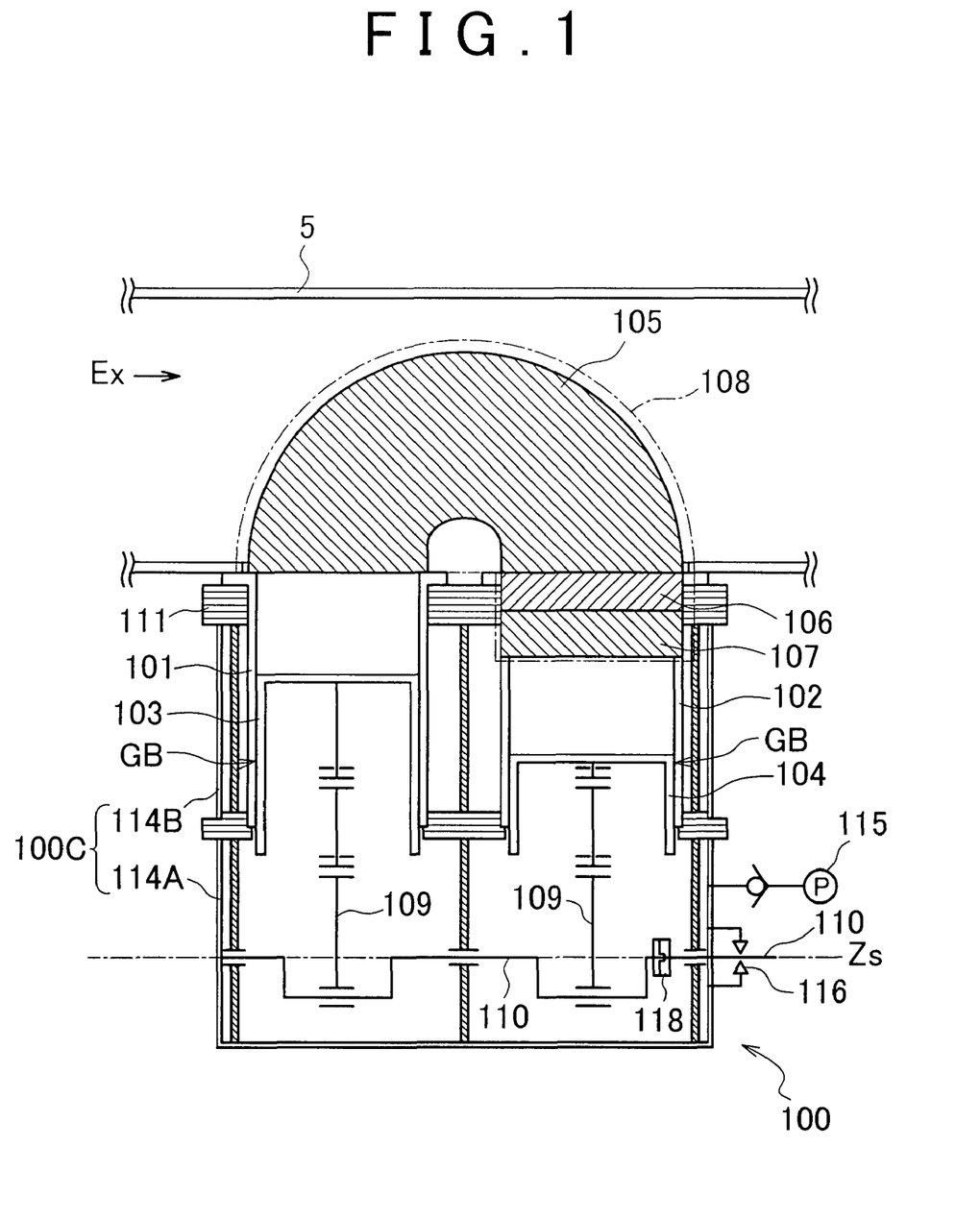
FIG. 1 is a sectional view showing a Stirling engine, which functions as an exhaust heat recovery unit of a first embodiment.

FIG. 1 is a sectional view showing the Stirling engine, which functions as the exhaust heat recovery unit of the first embodiment. The Stirling engine 100, which functions as the exhaust heat recovery unit of the first embodiment, is a so-called α-type in-line two-cylinder Stirling engine. In the Stirling engine 100, arranged in an in-line arrangement are: a high temperature-side piston 103, which is a first piston, housed in a high temperature-side cylinder 101, which is a first cylinder; and a low temperature-side piston 104, which is a second piston, housed in a low temperature-side cylinder 102, which is a second cylinder.

The high temperature-side cylinder 101 and the low temperature-side cylinder 102 are directly or indirectly supported by, or fixed to a base plate 111, which functions as a reference body. In the Stirling engine 100 of the embodiment, the base plate 111 serves as a positional reference of the components of the Stirling engine 100. With this configuration, it is made possible to ensure the accuracy of the relative position between the components. In addition, as described later, in the Stirling engine 100 of the embodiment, respective gas bearings GB are interposed between the high temperature-side cylinder 101 and the high temperature-side piston 103, and between the low temperature-side cylinder 102 and the low temperature-side piston 104.

By fixing the high temperature-side cylinder 101 and the low temperature-side cylinder 102 directly or indirectly to the base plate 111, which functions as the reference body, it is possible to maintain the clearance between the piston and the cylinder with precision. Thus, the function of the gas bearings GB is satisfactorily carried out. In addition, it becomes easy to assemble the Stirling engine 100.

A heat exchanger 108 constituted of a substantially U-shaped heater 105, a regenerator 106, and a cooler 107 is disposed between the high temperature-side cylinder 101 and the low temperature-side cylinder 102. If the heater 105 is formed in a substantially U-shape in this way, it is possible to easily dispose the heater 105 even in a relatively narrow space, such as in the exhaust gas passage of the internal combustion engine. In addition, if the high temperature-side cylinder 101 and the low temperature-side cylinder 102 are arranged in an in-line arrangement as in the case of the Stirling engine 100, it is possible to relatively easily dispose the heater 105 even in a cylindrical space, such as in the exhaust gas passage of the internal combustion engine.

One end of the heater 105 is positioned next to the high temperature-side cylinder 101, and the other end thereof is positioned next to the regenerator 106. One end of the regenerator 106 is positioned next to the heater 105, and the other end thereof is positioned next to the cooler 107. One end of the cooler 107 is positioned next to the regenerator 106, and the other end thereof is positioned next to the low temperature-side cylinder 102.

A working fluid (air in the embodiment) is confined in the high temperature-side cylinder 101, the low temperature-side cylinder 102 and the heat exchanger 108, and realizes the Stirling cycle with the heat supplied from the heater 105 and the heat discharged from the cooler 107 to drive the Stirling engine 100.

The heater 105 and the cooler 107 may be formed by bundling a plurality of tubes made of a material that has high thermal conductivity and excellent thermal resistance, for example. The regenerator 106 may be made of a porous heat storage unit. The composition of the heater 105, the cooler 107 and the regenerator 106 is not limited to this example. Specifically, the composition may be suitably selected depending on the thermal conditions of the subject from which exhaust heat is recovered, the specifications of the Stirling engine 100, etc.

With regard to the heat exchanger 108, at least the heater 105 is disposed in an exhaust gas passage 5. The heater 105 heats up the working fluid in the heater 105 using the thermal energy of the exhaust gas Ex flowing through the exhaust gas passage 5. The regenerator 106 of the heat exchanger 108 may also be disposed in the exhaust gas passage 5.

In the first embodiment, the exhaust gas Ex flows from the high-temperature cylinder 101 side to the low-temperature cylinder 102 side. Thus, the exhaust gas Ex discharged from the heat engine is supplied to the heater 105 with a small drop in the temperature thereof, so that it is possible to efficiently recover the thermal energy of the exhaust gas Ex.

As described above, the high temperature-side piston 103 and the low temperature-side piston 104 are supported in the high temperature-side cylinder 101 and the low temperature-side cylinder 102, respectively, with the respective gas bearings GB interposed therebetween. In other words, the piston is supported in the cylinder without any piston rings. In this way, it is possible to reduce the friction between the piston and the cylinder, thereby improving the thermal efficiency of the Stirling engine 100. In addition, the reduction in the friction between the piston and the cylinder makes it possible to recover thermal energy by operating the Stirling engine 100 even under the operating conditions of a low-temperature heat source and low temperature difference, such as in the case of the exhaust heat recovery of the internal combustion engine.

As shown in FIG. 1, the components of the Stirling engine 100, such as the high temperature-side cylinder 101, the high temperature-side piston 103, a connecting rod 109 and a crankshaft 110, are housed in a housing 100C. The housing 100C of the Stirling engine 100 includes a crankcase 114A and a cylinder block 114B. A pressurizing means 115 increases the pressure in the housing 100C. The purpose of this is to pressurize the working fluid in the high temperature-side cylinder 101, the low temperature-side cylinder 102 and the heat exchanger 108 to obtain more power output from the Stirling engine 100.

In the Stirling engine 100 of the embodiment, a sealed bearing 116 is fitted to the housing 100C, and supports the crankshaft 110. The power output from the crankshaft 110 is output from the housing 100C through a flexible coupling 118, such as the Oldham's coupling. Next, a configuration of the exhaust heat recovery apparatus according to the embodiment will be described.

Figure 2:
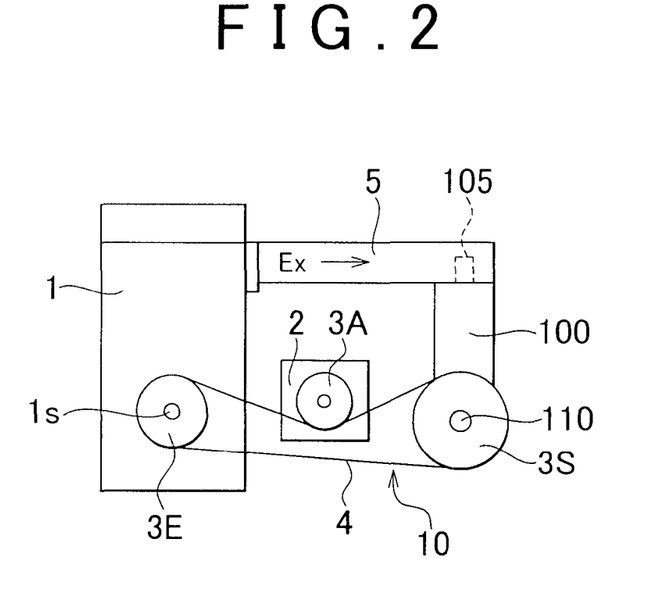
FIG. 2 is a front view showing a configuration of the exhaust heat recovery apparatus according to the first embodiment.
Figure 3:
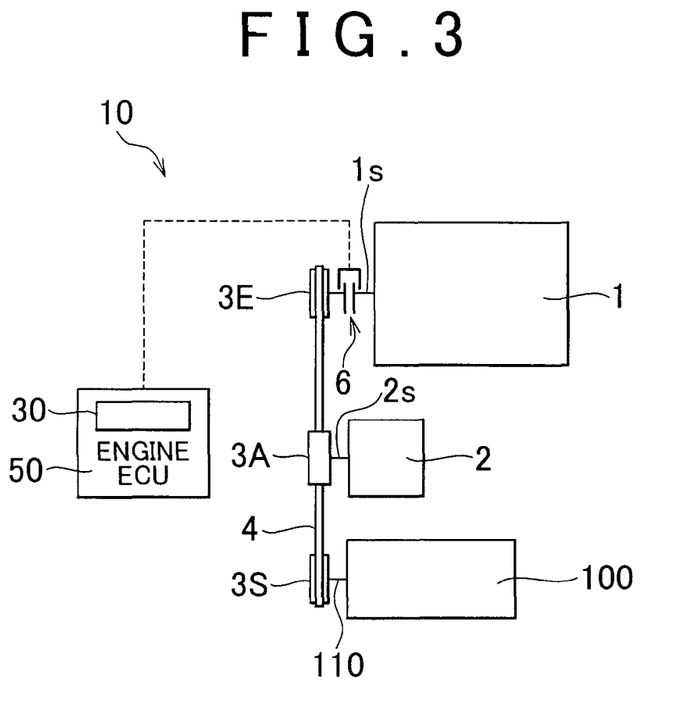
FIG. 3 is a plan view showing the configuration of the exhaust heat recovery apparatus according to the first embodiment.

FIG. 2 is a front view showing the configuration of the exhaust heat recovery apparatus according to the first embodiment. FIG. 3 is a plan view showing the configuration of the exhaust heat recovery apparatus according to the first embodiment. The exhaust heat recovery apparatus 10 according to the first embodiment is mounted on a vehicle, and serves as a motive power source. The exhaust heat recovery apparatus 10 according to the first embodiment includes: the Stirling engine 100, which functions as the exhaust heat recovery unit; the power transmission-switching means 6; and the auxiliary 2.

In the exhaust heat recovery apparatus 10 according to the first embodiment, the Stirling engine 100 is disposed near the internal combustion engine 1, which functions as the heat engine from which exhaust heat is recovered. The Stirling engine 100 and the internal combustion engine 1 are arranged so that the crankshaft 110 of the Stirling engine 100 and an output shaft 1s of the internal combustion engine 1 are arranged substantially in parallel. In this way, it is possible to transmit the motive power produced by the Stirling engine 100 to the output shaft (heat engine output shaft) 1s of the internal combustion engine 1 using a belt, a chain, a gear train, or the like. In addition, it is possible to use the Stirling engine 100 to recover the exhaust heat of the internal combustion engine 1 without any significant changes in the design of the conventional internal combustion engine 1.

The heater 105 of the Stirling engine 100 is disposed in the exhaust gas passage 5 of the internal combustion engine 1. The Stirling engine 100 produces motive power by recovering, through the heater 105, the thermal energy of the exhaust gas Ex discharged from the internal combustion engine 1. The motive power is output from the crankshaft (exhaust-heat-recovery-unit output shaft) 110 of the Stirling engine 100.

A Stirling engine pulley 3S is fixed to the crankshaft 110 of the Stirling engine 100. An internal combustion engine pulley 3E is fixed to the output shaft 1s of the internal combustion engine 1. A belt 4, which functions as a power transmission means, is looped around the Stirling engine pulley 3S and the internal combustion engine pulley 3E. With this configuration, the motive power produced by the Stirling engine 100 is transmitted to the output shaft 1s of the internal combustion engine 1. The motive power produced by the Stirling engine 100 is output from the output shaft 1s of the internal combustion engine 1 together with the motive power produced by the internal combustion engine 1. The mechanism for transmitting the motive power from the Stirling engine 100 to the output shaft 1s of the internal combustion engine 1 is not limited to such a mechanism. A chain and sprockets, or a gear train may be used.

The internal combustion engine 1 and the Stirling engine 100 are mounted on a vehicle, such as a passenger car and a truck, and serve as motive power sources of the vehicle. When the vehicle is running, the internal combustion engine 1 always produces motive power, serving as a primary motive power source. The Stirling engine 100 cannot produce minimum necessary motive power unless the temperature of the exhaust gas Ex reaches a certain temperature. For this reason, after the temperature of the exhaust gas Ex exceeds a predetermined temperature, the Stirling engine 100 produces motive power using the thermal energy recovered from the exhaust gas Ex of the internal combustion engine 1 to drive the vehicle in cooperation with the internal combustion engine 1. Thus, the Stirling engine 100 serves as a secondary motive power source of the vehicle.

A clutch 6, which functions as the power transmission-switching means, is provided between the internal combustion engine 1, which functions as the heat engine, and the Stirling engine 100, which functions as the exhaust heat recovery unit, the same clutch 6 being provided between the internal combustion engine 1 and the auxiliary 2. In the first embodiment, the clutch 6, which functions as the power transmission-switching means, is fixed to the output shaft 1s of the internal combustion engine 1. With this configuration, it is possible to switch the transmission of the motive power produced by the Stirling engine 100 from the internal combustion engine pulley 3E to the output shaft 1s of the internal combustion engine 1. When the clutch 6 is engaged, the crankshaft 110 of the Stirling engine 100 and the output shaft 1s of the internal combustion engine 1 are mechanically connected. Thus, the motive power produced by the Stirling engine 100 is transmitted to the output shaft 1s of the internal combustion engine 1 through the clutch 6. When the clutch 6 is released, the connection between the internal combustion engine 1 and the Stirling engine 100 is cut off, and, therefore, the motive power from the Stirling engine 100 is not transmitted from the internal combustion engine pulley 3E to the output shaft 1s of the internal combustion engine 1. The operation of the clutch 6 is controlled by a clutch control section 30 in the engine ECU (Electronic Control Unit) 50.

In the exhaust heat recovery apparatus 10 according to the first embodiment, at least the Stirling engine 100 drives the auxiliary 2. The auxiliary 2 is an auxiliary of the vehicle on which the Stirling engine 100 and the internal combustion engine 1 is mounted. For example, the auxiliary is the compressor that the air conditioning system of the vehicle has, the water pump for circulating the coolant of the internal combustion engine 1 or the coolant of the cooler 107 of the Stirling engine 100.

The auxiliary 2 receives motive power through an input shaft (auxiliary input shaft) 2s of the auxiliary 2, and is driven by the motive power, thereby carrying out the function of an auxiliary. An auxiliary pulley 3A is fixed to the input shaft 2s, and is driven by at least the Stirling engine 100 through the belt 4. When the clutch 6 is engaged, the Stirling engine 100 and the internal combustion engine 1 drive the auxiliary 2. When the clutch 6 is released, the Stirling engine 100 drives the auxiliary 2. With such a configuration, when there is no request to drive the heat engine (for example, while the internal combustion engine is stopped because of the Idling Stop), it is possible to drive the auxiliary 2 using the Stirling engine 100 by releasing the clutch 6.

Figure 4:
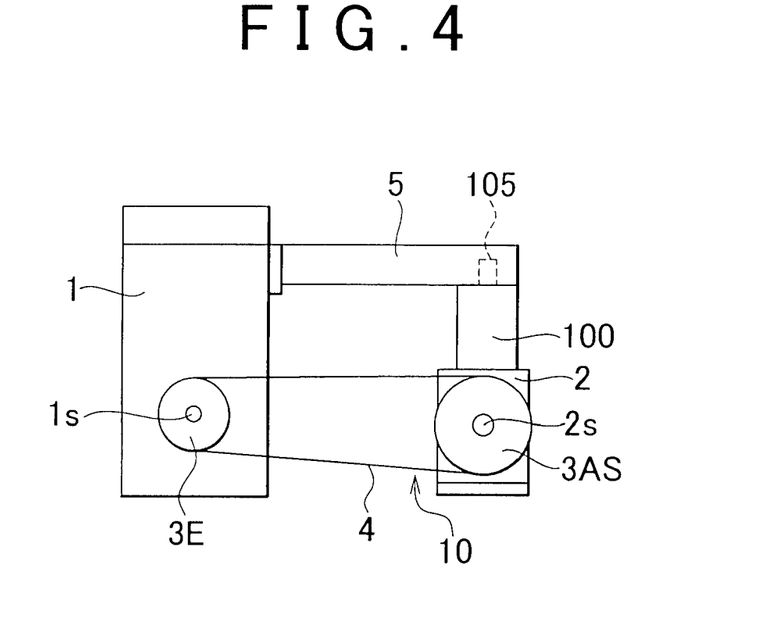
FIG. 4 is a front view showing another example of a configuration of the exhaust heat recovery apparatus according to the first embodiment.
Figure 5:
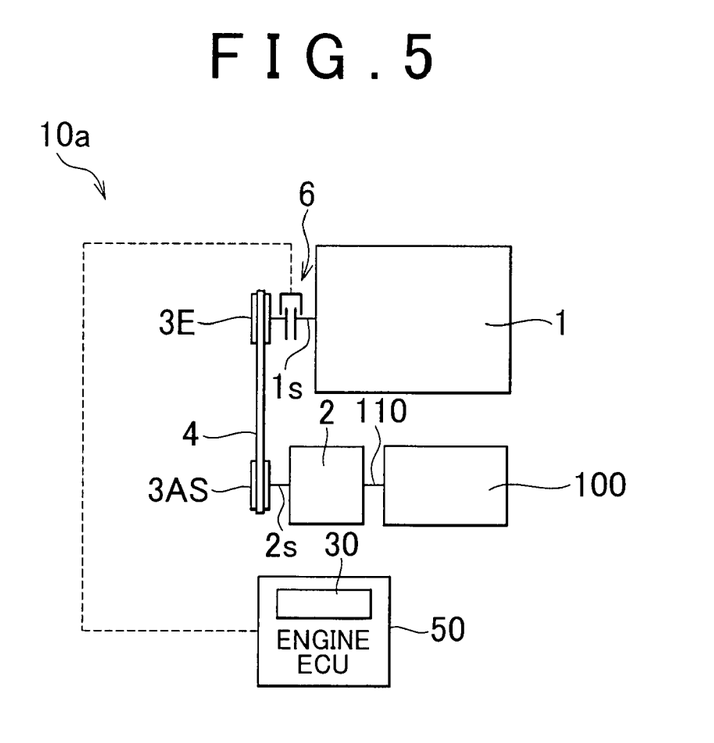
FIG. 5 is a plan view showing the example of the configuration of the exhaust heat recovery apparatus according to the first embodiment.

FIG. 4 is a front view showing another example of a configuration of the exhaust heat recovery apparatus according to the first embodiment. FIG. 5 is a plan view showing this example of the configuration of the exhaust heat recovery apparatus according to the first embodiment. In the exhaust heat recovery apparatus 10a, the crankshaft 110 of the Stirling engine 100 and one end of the input shaft 2s of the auxiliary 2 are coupled. An auxiliary/Stirling engine pulley 3AS is fixed to the other end of the input shaft 2s of the auxiliary 2.

The belt 4 is looped around the auxiliary/Stirling engine pulley 3AS and the internal combustion engine pulley 3E that is fixed to the output shaft 1s of the internal combustion engine 1. Thus, the Stirling engine 100 drives the auxiliary 2, and the remaining motive power is transmitted to the internal combustion engine 1 through the input shaft 2s of the auxiliary 2, and output together with the motive power produced by the internal combustion engine 1. The motive power from the Stirling engine 100 is output together with the motive power from the internal combustion engine 1 in this way, so that it is possible to reduce the energy loss as compared to the case where the motive power from the Stirling engine 100 is temporarily converted into electric energy.

The clutch 6, which the power transmission-switching device, is provided between the internal combustion engine 1, which functions as the heat engine, and the Stirling engine 100, which functions as the exhaust heat recovery unit, the same clutch 6 being provided between the internal combustion engine 1 and the auxiliary 2. In this embodiment, the clutch 6, which functions as the power transmission-switching device, is fixed to the output shaft 1s of the internal combustion engine 1. The operation of the clutch 6 is controlled by the clutch control section 30 in the engine ECU 50. With such a configuration, when there is no request to drive the internal combustion engine 1 (for example, while the internal combustion engine is stopped because of the Idling Stop or economy running), it is possible to drive the auxiliary 2 using the Stirling engine 100 by releasing the clutch 6.

Figure 6:
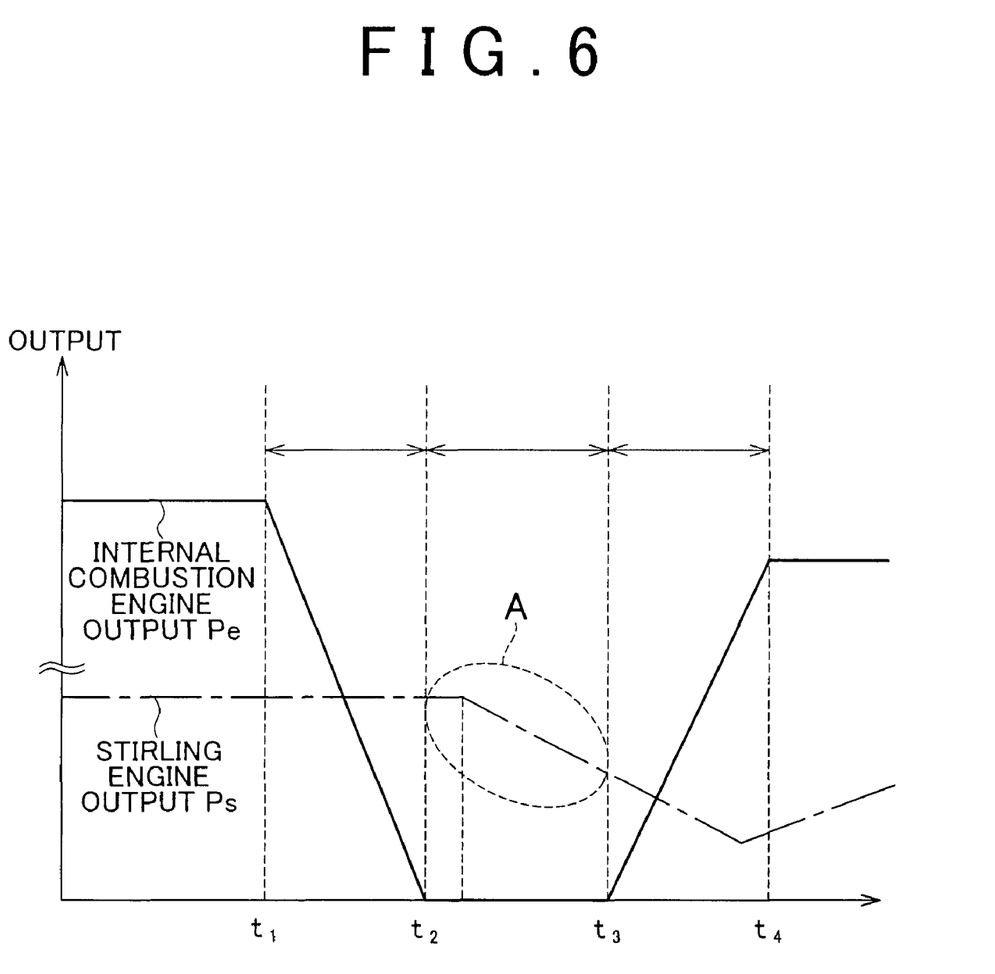
FIG. 6 is a schematic diagram showing the variation with time of the motive power (power output) produced by an internal combustion engine and the motive power (power output) produced by the Stirling engine when a vehicle on which the exhaust heat recovery apparatus according to the first embodiment is mounted runs and stops.

FIG. 6 is a schematic diagram showing the variation with time of the motive power (power output) produced by the internal combustion engine and the motive power (power output) produced by the Stirling engine when a vehicle on which the exhaust heat recovery apparatus according to the first embodiment is mounted runs and stops. After the Stirling engine 100 begins producing motive power (power output) by recovering thermal energy from the exhaust gas discharged from the internal combustion engine 1, the clutch 6 is engaged, so that the vehicle on which the exhaust heat recovery apparatus 10 according to this embodiment is mounted is driven by the internal combustion engine 1 and the Stirling engine 100. Under this condition, a required power output Pd for the vehicle is the sum of the motive power (internal combustion engine output) Pe produced by the internal combustion engine 1 and the motive power (exhaust heat recovery unit output) Ps produced by the Stirling engine 100.

In the example shown in FIG. 6, the vehicle starts deceleration at t1, and stops at t2. Thereafter, the vehicle starts to run and accelerates at t3, and then runs at a constant speed from t4. When the vehicle is in a deceleration condition (t1 to t2), the motive power Pe produced by the internal combustion engine 1 gradually decreases. With this decrease, the temperature of the exhaust gas discharged by the internal combustion engine 1 also decreases.

By virtue of the heat capacity of the heater 105 and the regenerator 106, the Stirling engine 100 continues to produce motive power until the amount of the heat stored in the heater 105, etc is reduced to a certain level. Thus, even if the internal combustion engine output Pe drops between t1 and t2, the exhaust heat recovery unit output Ps remains substantially constant. Then, after a certain time has passed since the vehicle stops and the internal combustion engine output Pe becomes zero, the exhaust heat recovery unit output Ps starts to decrease.

When the vehicle stops, the required power output Pd becomes zero. Specifically, there is neither request to drive the internal combustion engine 1, nor request to drive the Stirling engine 100. Although the internal combustion engine output Pe becomes zero in this case, the Stirling engine 100 produces motive power by virtue of the heat capacity of the heater 105, etc. even after the internal combustion engine 1 stops, and the exhaust heat recovery unit output Ps therefore becomes a surplus. In this embodiment, when the required power output Pd for the vehicle is zero (that is, when there is no request to drive either of the internal combustion engine 1 and the Stirling engine 100), the clutch 6 is released to drive the auxiliary 2 using the surplus, exhaust heat recovery unit output Ps. In this way, it becomes possible to effectively use the surplus, exhaust heat recovery unit output Ps.

When the vehicle starts to run at t3, the internal combustion engine output Pe starts to increase, and the temperature of the exhaust gas generated by the internal combustion engine 1 also starts to increase. Because the heat input from the exhaust gas is transferred to the working fluid through the heater 105, the Stirling engine 100 is less responsive to the variation of the heat input, and the output thereof is slow in following the rapid variation of the heat input. For this reason, the exhaust heat recovery unit output Ps increases with some delay relative to the increase in the internal combustion engine Pe. In this case, the internal combustion engine 1 drives the Stirling engine 1, and, therefore, the motive power produced by the internal combustion engine 1 is used by the Stirling engine 100. As a result, the motive power produced by the internal combustion engine 1 declines, and there is a possibility that the required power output Pd cannot be obtained.

In such a case, in this embodiment, it may be avoided by releasing the clutch 6 that the Stirling engine 100 applies a load to the internal combustion engine 1. Then, the required power output Pd is produced by the internal combustion engine 1 alone. In this way, it is possible to control the waste of the internal combustion engine output Pe. Next, an example of control of the exhaust heat recovery apparatus 10 according to this embodiment will be briefly described.

Figure 7:
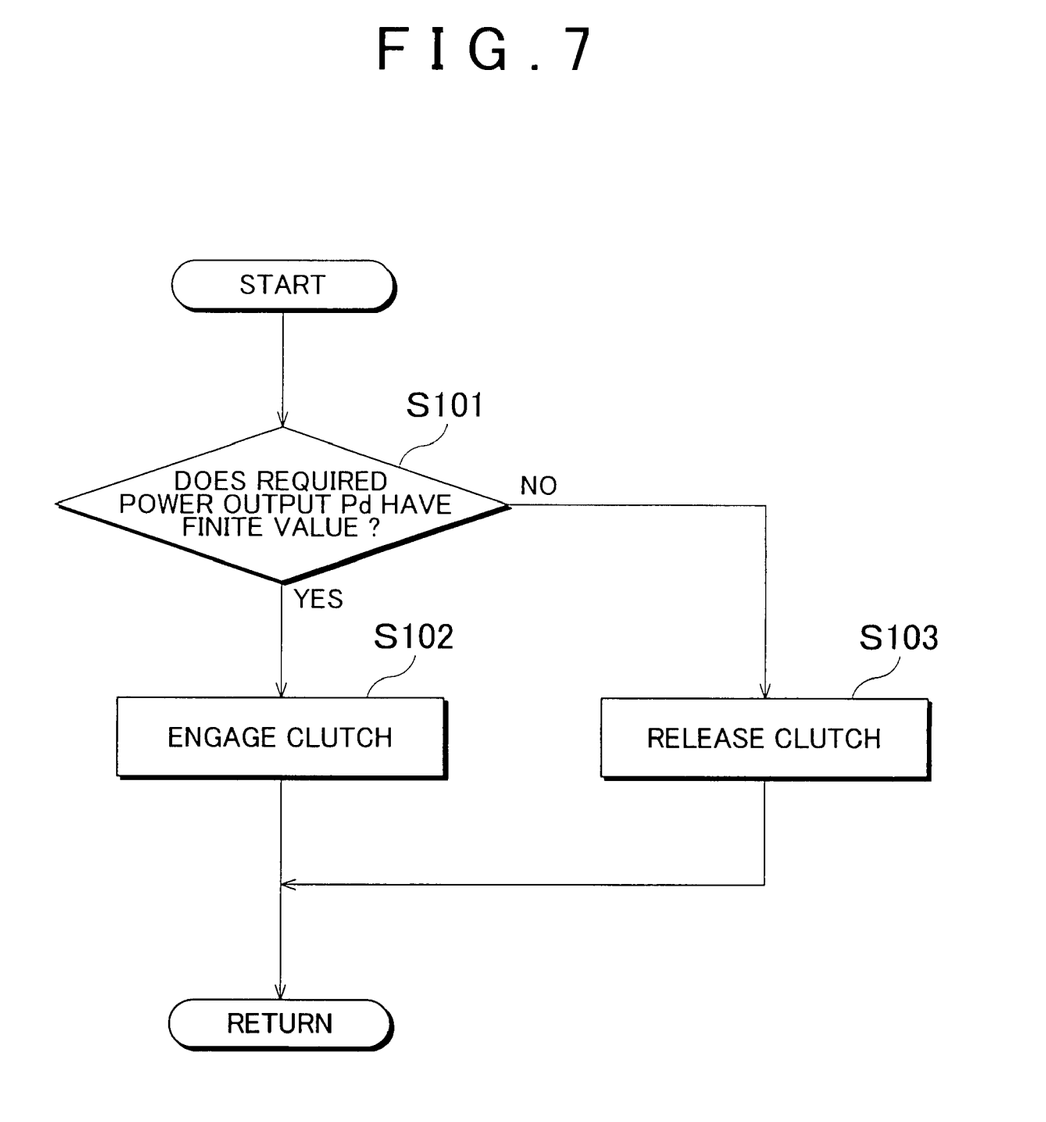
FIG. 7 is a flow chart showing an example of operation control of the exhaust heat recovery apparatus according to the first embodiment.

FIG. 7 is a flow chart showing an example of operation control of the exhaust heat recovery apparatus according to the first embodiment. When the operation control of the exhaust heat recovery apparatus 10 or 10*a* according to the first embodiment is performed, it is assumed that the Stirling engine 100 is recovering thermal energy from the exhaust gas from the internal combustion engine 1 and producing motive power. The clutch control section 30 of the engine ECU 50 determines whether the required power output Pd to drive the vehicle on which the exhaust heat recovery apparatus 10 according to the embodiment is mounted has a finite value (S101). The required power output can be calculated based on the accelerator pedal operation amount, the running speed of the vehicle, etc.

When the required power output Pd has a finite value (Yes in step S101), the clutch control section 30 engages the clutch 6 (S102). In this way, the motive power produced by the Stirling engine 100 is output together with the motive power produced by the internal combustion engine 1 to drive the vehicle. When the required power output Pd is zero (No in step S101), that is, when there is no request to drive either of the internal combustion engine 1 and the Stirling engine 100, the clutch control section 30 releases the clutch 6 (S103). Thus, the motive power produced by the Stirling engine 100 is not transmitted to the internal combustion engine 1, and it is possible to drive the auxiliary 2 using the Stirling engine 100. Accordingly, it is made possible to effectively use the surplus motive power produced by the Stirling engine 100.

A modification of the first embodiment is similar to the first embodiment, except that a power transmission-switching means is provided between the exhaust heat recovery unit and the subject (internal combustion engine) from which exhaust heat is recovered, and a power transmission-switching means is provided between the exhaust heat recovery unit and the auxiliary. In the other points, the modification is similar to the above embodiment.

Figure 8:
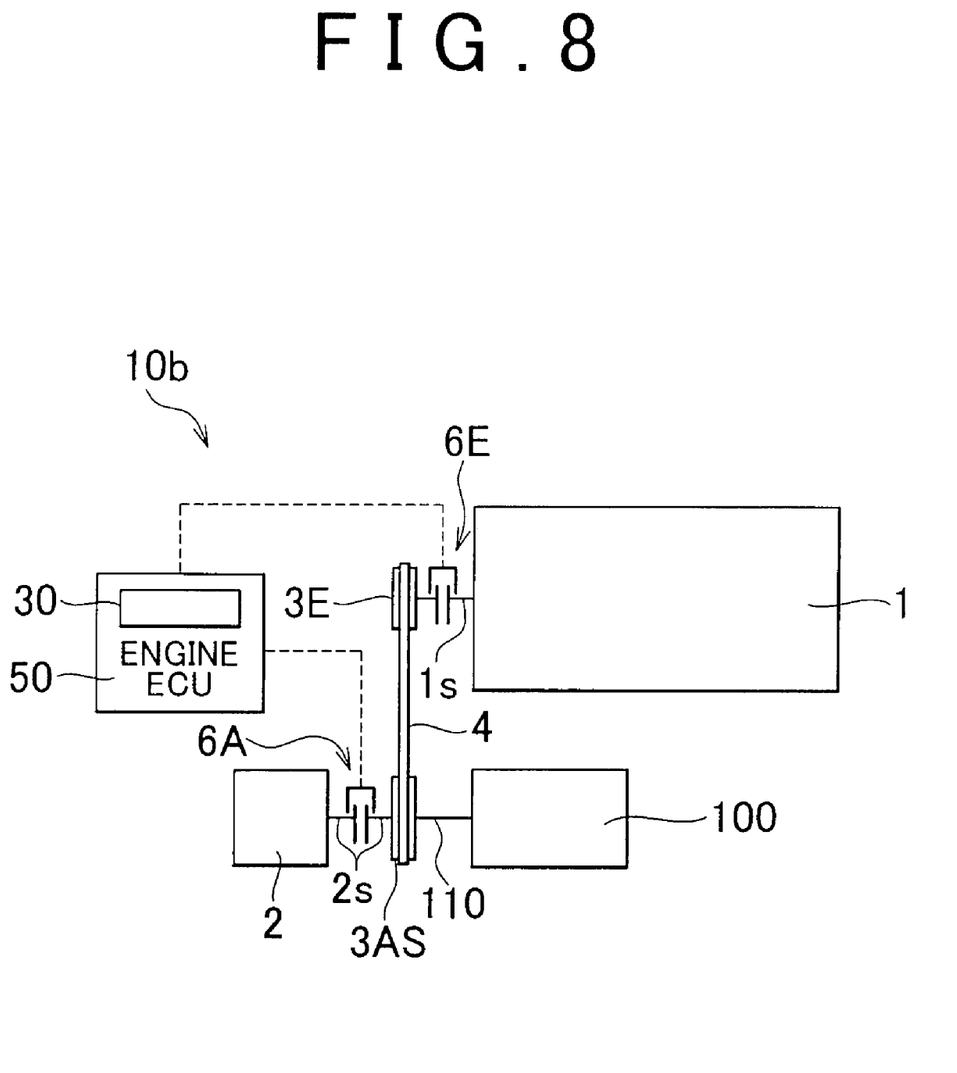
FIG. 8 is a schematic diagram for explaining a configuration of an exhaust heat recovery apparatus according to a modification of the first embodiment.

FIG. 8 is a schematic diagram for explaining a configuration of the exhaust heat recovery apparatus according to the modification of the first embodiment. In the exhaust heat recovery apparatus 10*b* according to the modification, a first clutch 6E, which functions as the first power transmission-switching means, is provided between the internal combustion engine 1, which functions as the heat engine, and the Stirling engine 100, which functions as the exhaust heat recovery unit, the same clutch 6 being provided between the internal combustion engine 1 and the auxiliary 2. In the modification, the first clutch 6E is provided on the output shaft 1*s* of the internal combustion engine 1. In addition, the internal combustion engine pulley 3E is coupled to the output shaft 1*s* of the internal combustion engine 1 with the first clutch 6E interposed therebetween.

In the exhaust heat recovery apparatus 10*b* according to the modification, the auxiliary/Stirling engine pulley 3AS is fixed to the crankshaft 110 of the Stirling engine 100 and to the input shaft 2*s* of the auxiliary 2. In addition, a second clutch 6A, which functions as the second power transmission-switching means, is provided on the input shaft 2*s* of the auxiliary 2. The belt 4, which functions as the power transmission-switching means, is looped around the auxiliary/Stirling engine pulley 3AS and the internal combustion engine pulley 3E. The operation of the first and second clutches 6E and 6A is controlled by the clutch control section 30 of the engine ECU 50.

With this configuration, when the first clutch 6E is engaged, the crankshaft 110 of the Stirling engine 100 and the output shaft 1*s* of the internal combustion engine 1 are mechanically connected. In this way, the motive power produced by the Stirling engine 100 is transmitted to the output shaft 1*s* of the internal combustion engine 1. The motive power produced by the Stirling engine 100 is output from the output shaft 1*s* of the internal combustion engine 1 together with the motive power produced by the internal combustion engine 1. On the other hand, when the first clutch 6E is released, the connection between the internal combustion engine 1 and the Stirling engine 100 is cut off, and, therefore, the motive power produced by the Stirling engine 100 is not transmitted from the internal combustion engine pulley 3E to the output shaft 1*s* of the internal combustion engine 1.

When the auxiliary 2 is driven, by releasing the first clutch 6E and engaging the second clutch 6A, it becomes possible to drive the auxiliary 2 using the Stirling engine 100 alone. When there is no need to drive the auxiliary 2, the second clutch 6A may be released. When there is no need to drive the auxiliary 2, and the motive power from the Stirling engine 100 is transmitted to the output shaft 1*s* of the internal combustion engine 1, releasing the second clutch 6A prevents the auxiliary 2 from becoming a load to the Stirling engine 100. Accordingly, it is possible to transmit the motive power produced by the Stirling engine 100 to the output shaft 1*s* of the internal combustion engine 1 without wasting, and output the motive power together with the motive power produced by the internal combustion engine 1. Next, an example of control of the exhaust heat recovery apparatus 10*b* according to the modification will be briefly described.

Figure 9:
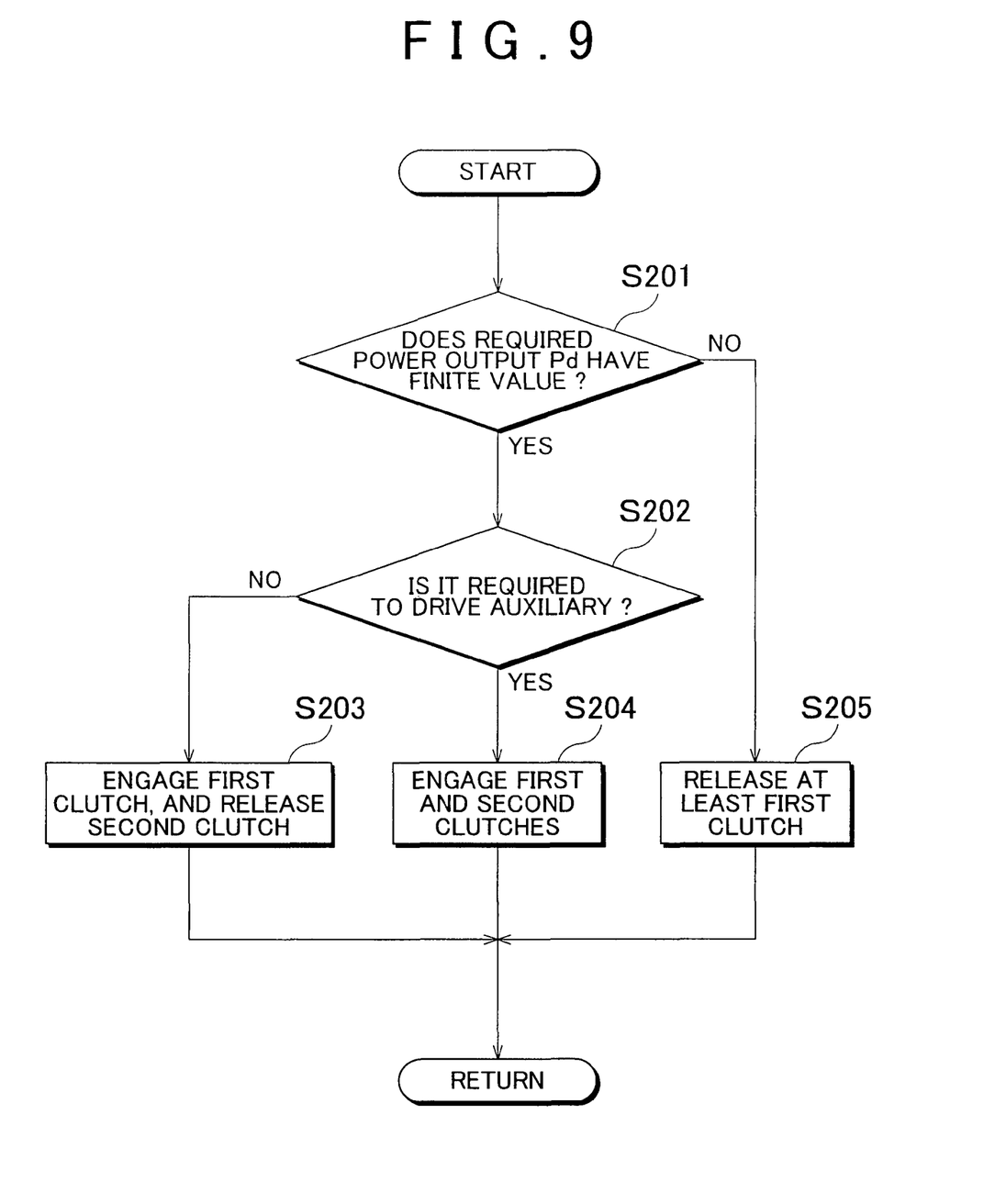
FIG. 9 is a flow chart for explaining an example of operation control of the exhaust heat recovery apparatus according to the modification of the first embodiment.

FIG. 9 is a flow chart for explaining an example of operation control of the exhaust heat recovery apparatus according to the modification of the first embodiment. When the operation control of the exhaust heat recovery apparatus 10*b* according to the modification is performed, it is assumed that the Stirling engine 100 is recovering thermal energy from the exhaust gas from the internal combustion engine 1 and producing motive power. In this case, the clutch control section 30 of the engine ECU 50 determines whether the required power output Pd to drive the vehicle on which the exhaust heat recovery apparatus 10*b* according to this embodiment is mounted has a finite value (S201). The required power output can be calculated based on the accelerator pedal operation amount, the running speed of the vehicle, etc.

When the required power output Pd has a finite value (Yes in step S201), the clutch control section 30 determines whether it is required to drive the auxiliary (S202). When it is not required to drive the auxiliary 2 (No in step S202), the clutch control section 30 engages the first clutch 6E and releases the second clutch 6A (S203). Under such a condition, because the second clutch 6A is in a released state, the auxiliary 2 does not apply a load to the Stirling engine 100. Accordingly, the motive power produced by the Stirling engine 100 is transmitted to the output shaft 1*s* of the internal combustion engine 1 through the auxiliary/Stirling engine pulley 3AS, the belt 4, and the internal combustion engine pulley 3E without wasting, and is output together with the motive power produced by the internal combustion engine 1.

When the required power output Pd has a finite value (Yes in step S201), and there is a request to drive the auxiliary 2 (Yes in step S202), the clutch control section 30 engages the first clutch 6E and also engages the second clutch 6A (S204). As a result, the auxiliary 2 is driven, and the motive power produced by the Stirling engine 100 is output together with the motive power produced by the internal combustion engine 1.

When the required power output Pd is zero (No in step S201), that is, when there is no request to drive the internal combustion engine 1 and the Stirling engine 100, the clutch control section 30 releases at least the first clutch 6E (S205). Thus, when there is a request to drive the auxiliary 2, it is possible to drive the auxiliary 2 using the Stirling engine 100 alone independently of the internal combustion engine 1.

In the first embodiment and the modification thereof, the motive power produced by the exhaust heat recovery unit and the motive power produced by the heat engine are combined and output, and the auxiliary that is driven by at least the exhaust heat recovery unit is provided. The power transmission-switching means is provided between the heat engine and the exhaust heat recovery unit, the same power transmission-switching means being provided between the heat engine and the auxiliary. When there is no request to drive the heat engine, the connection between the heat engine and the auxiliary is cut off by the power transmission-switching means, and the auxiliary is driven by the exhaust heat recovery unit alone. Thus, when there is no request to drive the heat engine, it is possible to separate the heat engine and the exhaust heat recovery unit, and drive the auxiliary using the exhaust heat recovery unit alone, so that it is possible to effectively use the surplus motive power produced by the exhaust heat recovery unit even when there is no request to drive the heat engine. It should be noted that an apparatus having a configuration similar to that disclosed by the first embodiment and the modification thereof shows operations and effects similar to those of the first embodiment and the modification thereof. In addition, the configuration disclosed by the first embodiment and the modification thereof can be applied also in the following embodiment as appropriate.

The second embodiment is substantially the same as the first embodiment and the modification thereof, except that a heat storage means for storing the heat of the exhaust gas is fixed on a high-temperature portion of the exhaust heat recovery unit, and that the heat stored in the heat storage means is used to drive the exhaust heat recovery unit after the heat engine, from which exhaust heat is recovered, is stopped. In the other points, the second embodiment is similar to the first embodiment.

Figure 10:
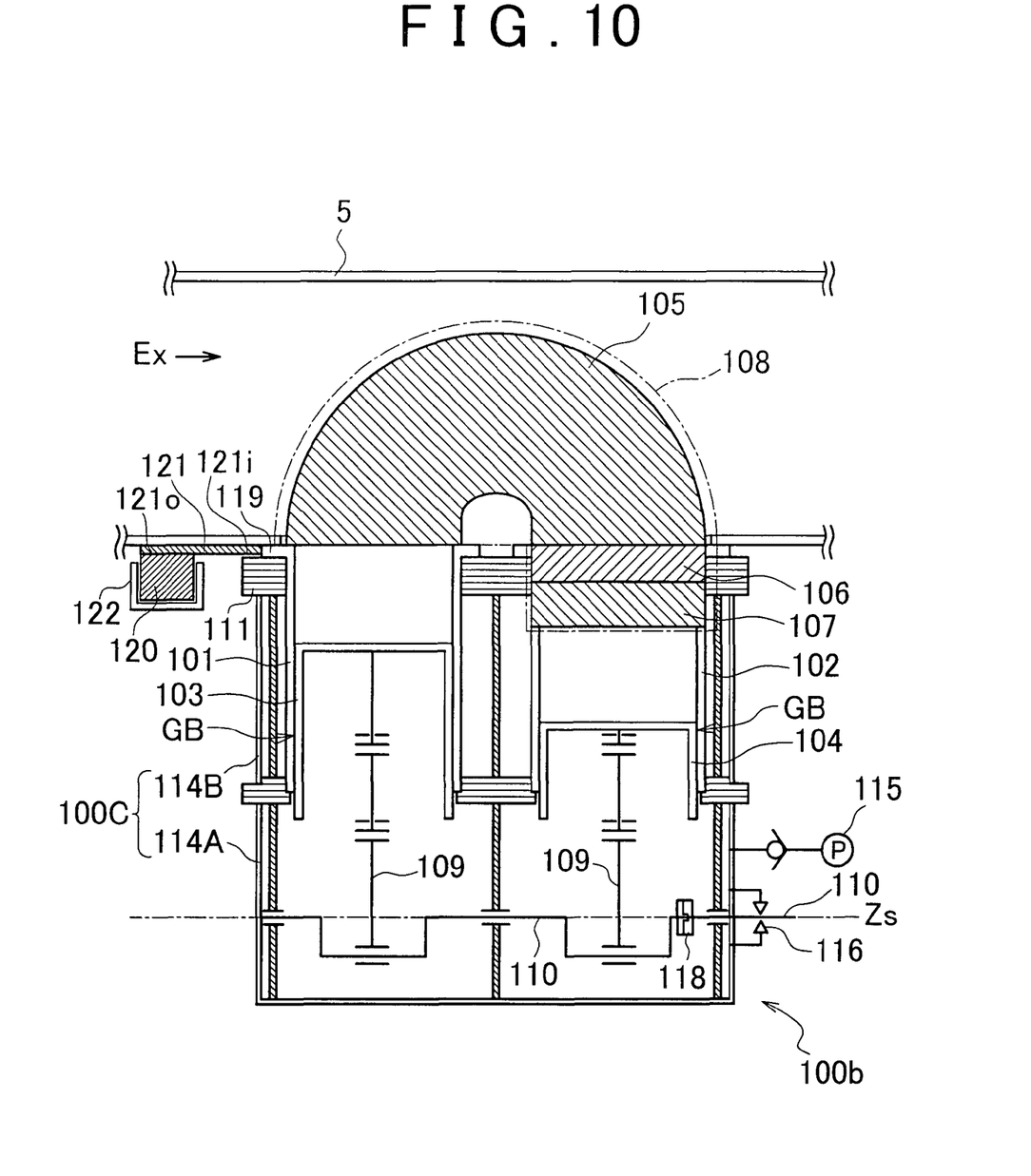
FIG. 10 is a sectional view showing a Stirling engine, which functions as an exhaust heat recovery unit of a second embodiment.
Figure 11:
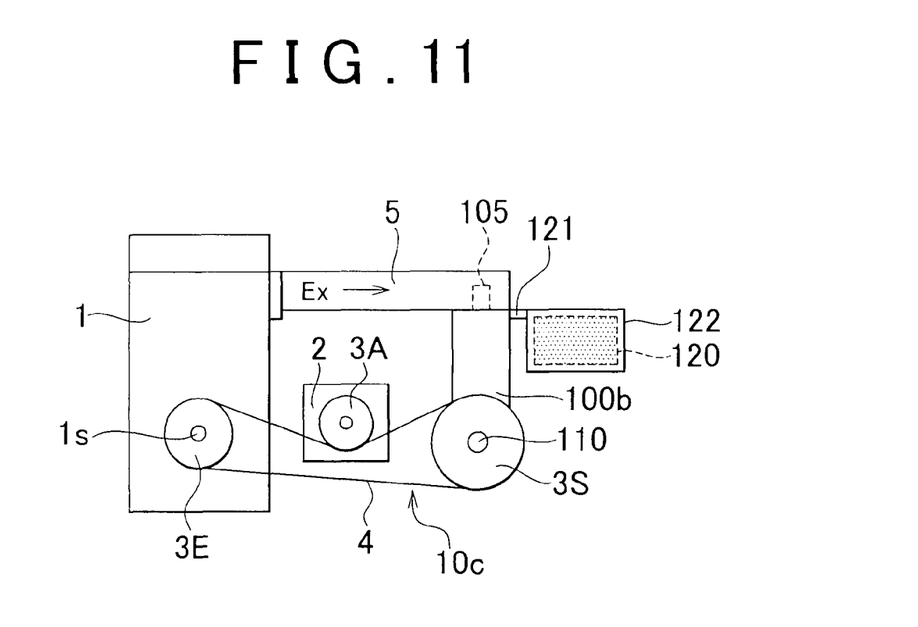
FIG. 11 is a front view showing a configuration of the exhaust heat recovery apparatus according to the second embodiment.
Figure 12:
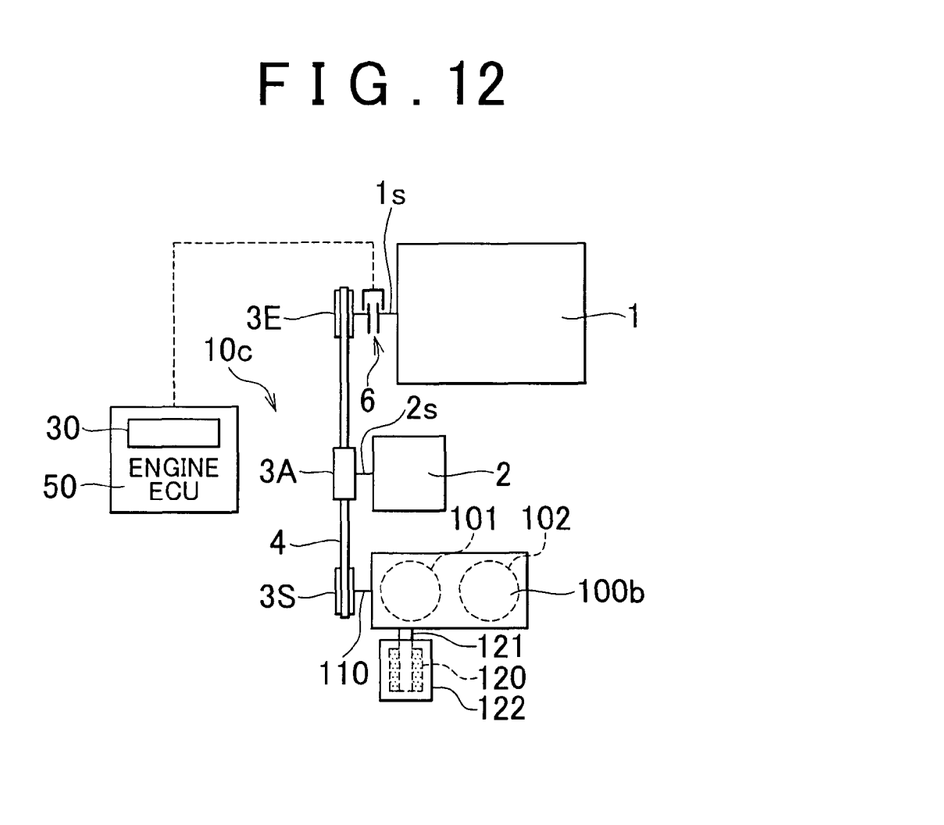
FIG. 12 is a plan view showing the configuration of the exhaust heat recovery apparatus according to the second embodiment.

FIG. 10 is a sectional view showing a Stirling engine, which functions as the exhaust heat recovery unit of the second embodiment. FIG. 11 is a front view showing a configuration of the exhaust heat recovery apparatus according to the second embodiment. FIG. 12 is a plan view showing the configuration of the exhaust heat recovery apparatus according to the second embodiment. As shown in FIG. 10, the Stirling engine (exhaust heat recovery unit) 100b that the exhaust heat recovery apparatus 10c according to the second embodiment includes is provided with a heat storage material 120, which functions as the heat storage means, at a high-temperature portion.

The heat storage material 120 stores the heat of the exhaust gas EX discharged from the internal combustion engine 1. Metallic material, such as iron and aluminum, and cement, for example can be used as the heat storage material 120. The heat storage material 120 is surrounded by a heat insulator 122, so that the emission of the heat stored in the heat storage material 120 is suppressed. In this embodiment, in order to transfer the heat of the exhaust gas Ex to the heat storage material 120 and store the heat therein, a heat pipe 121 is used as a heat transfer means. The heat of the exhaust gas Ex is transferred to the heat storage material 120 through evaporation and condensation of the working fluid confined in the heat pipe 121. With the use of the heat pipe 121, it is possible to transfer heat from a heat source to the heat storage material 120 even when the heat source and the heat storage material 120 are distant from each other.

It is preferable that a heat input portion 121i of the heat pipe 121 be fixed on a high-temperature portion of the Stirling engine 100b. With this configuration, there is no need to provide the heat input portion 121i of the heat pipe 121 in the exhaust gas passage 5, and it is therefore possible to prevent the pressure loss in the exhaust gas passage 5 from increasing. It should be noted that a branch passage may be provided on the exhaust gas passage 5, and the heat input portion 121i of the heat pipe 121 may be provided in the branch passage to store the heat of the exhaust gas Ex.

The high-temperature portion of the Stirling engine 100b is a portion of which the temperature exceeds the temperature of the regenerator 106, including the regenerator 106. In this embodiment, the heat input portion 121i of the heat pipe 121 is installed on a flange portion 119 of the high temperature-side cylinder 101. A heat output portion 121o of the heat pipe 121 is installed on the heat storage material 120. Thus, the heat of the exhaust gas Ex is stored in the heat storage material 120 through the high temperature portion of the Stirling engine 100b.

With the use of the flange portion 119 of the high temperature-side cylinder 101, it is possible to relatively easily fix the heat input portion 121i of the heat pipe 121 on the high temperature portion of the Stirling engine 100b. The flange portion 119 of the high temperature-side cylinder 101 is a portion that is integrally formed with the high temperature-side cylinder 101, and projects on the side where the high temperature-side cylinder 101 and the heater 105 are connected, and engages with the base plate 111.

When the internal combustion engine 1 is stopped because the required power output from the internal combustion engine 1 becomes zero or because the Idling Stop is performed, and, as a result, supplying the exhaust gas Ex to the heater 105 of the Stirling engine 100b is stopped, the Stirling engine 100b is driven by the heat stored in the heater 105. At this time, the clutch 6 is released by the clutch control section 30 that the ECU 50 includes, and the Stirling engine 100 drives the auxiliary 2.

If the heat stored in the heater 105 is used to drive the Stirling engine 100b, the temperature of the heater 105 drops. When the temperature of the heater 105 drops below the temperature of the heat storage material 120, the heat in the heat storage material 120 is transferred to the heater 105 by heat conduction through the metallic portion of the heat pipe 121. In this way, the Stirling engine 100b is driven by the heat stored in the heat storage material 120. When the heat stored in the heat storage material 120 is used to the extent that it is impossible to drive the Stirling engine 100b, the Stirling engine 100b is stopped. As described above, in the exhaust heat recovery apparatus 10c according to this embodiment, the thermal energy of the exhaust gas Ex from the internal combustion engine 1 is stored in the heat storage material 120, so that it is possible to use the thermal energy of the exhaust gas Ex from the internal combustion engine 1 more effectively.

The heat input portion 121i of the heat pipe 121 may be fixed on the heat storage material 120, and the heat output portion 120o of the heat pipe 121 may be fixed on the high temperature portion (the flange portion 119 of the high temperature-side cylinder 101, for example) of the Stirling engine 100. Then, heat may be transferred from the heat storage material 120 to the heater 105 through evaporation and condensation of the working fluid confined in the heat pipe 121. In this case, the heat of the exhaust gas Ex is transferred to the heat storage material 120 by heat conduction through the metallic portion of the heat pipe 121.

As described above, in this embodiment, the heat storage means for storing the heat of the exhaust gas is fixed on the high temperature portion of the exhaust heat recovery unit, and the exhaust heat recovery unit is driven by the heat stored in the heat storage means after the heat engine, from which exhaust heat is recovered, is stopped. In this way, it is possible to effectively use the thermal energy of the exhaust gas discharged by the heat engine. It should be noted that an apparatus having a configuration similar to that disclosed by the second embodiment shows operations and effects similar to those of the second embodiment.

As described above, the exhaust heat recovery apparatus according to the present invention is useful with respect to the configuration in which the motive power produced by the exhaust heat recovery unit and the motive power produced by the heat engine are combined and output. In particular, the exhaust heat recovery apparatus is suitable to effectively use the surplus motive power produced by the exhaust heat recovery unit when there is no request to drive the heat engine.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. An exhaust heat recovery apparatus comprising:
an exhaust heat recovery unit that produces motive power by recovering thermal energy from exhaust heat, wherein the exhaust heat recovery unit is configured to be coupled to a heat engine, and the produced motive power is combined with motive power produced by the heat engine and is output together therewith;
an auxiliary configured to be coupled to the exhaust heat recovery unit and the heat engine, and driven by at least the exhaust heat recovery unit; and
a power transmission-switching device provided between the heat engine and the exhaust heat recovery unit and between the heat engine and the auxiliary, that decouples the heat engine from both the auxiliary and the exhaust heat recovery unit when a request to drive the heat engine falls below a predetermined level such that both the auxiliary and the exhaust heat recovery are isolated from the heat engine;
wherein the exhaust heat recovery unit comprises a high temperature-side cylinder, a low temperature-side cylinder, and a heat exchanger including a heater, a regenerator, and a cooler, the heat exchanger being connected to both the high temperature-side cylinder and the low temperature-side cylinder.

2. The exhaust heat recovery apparatus according to claim 1, wherein
the auxiliary is driven by the exhaust recovery unit through a belt.

3. The exhaust heat recovery apparatus according to claim 1, wherein
one end of an input shaft of the auxiliary is coupled to a crankshaft of the exhaust heat recovery unit, and is driven by the exhaust heat recovery unit.

4. The exhaust heat recovery apparatus according to claim 1, further comprising:
a second power transmission-switching device, fixed to the input shaft of the auxiliary, that decouples the auxiliary and the exhaust heat recovery unit.

5. The exhaust heat recovery apparatus according to claim 1, wherein
the exhaust heat recovery unit recovers thermal energy from exhaust gas discharged from the heat engine.

6. The exhaust heat recovery apparatus according to claim 5, further comprising:
a heat storage unit that stores heat obtained from the exhaust gas of the heat engine, wherein
when power output by the heat engine declines to a set point, and a temperature of a heater that the exhaust heat recovery unit includes to recover thermal energy drops below a temperature of the heat storage unit, heat is supplied from the heat storage unit to the heater to drive the exhaust heat recovery unit.

7. The exhaust heat recovery apparatus according to claim 6, wherein
a heat pipe is provided between the heat storage unit and the heater, and a heat output portion of the heat pipe is fixed on the heat storage unit.

8. The exhaust heat recovery apparatus according to claim 7, wherein
a heat input portion of the heat pipe is fixed on a high temperature portion of the exhaust heat recovery unit.

9. The exhaust heat recovery apparatus according to claim 8, wherein
the heat input portion of the heat pipe is fixed on a high temperature-side cylinder that the exhaust heat recovery unit includes.

10. The exhaust heat recovery apparatus according to claim 1, further comprising:
a controller sending a decoupling signal to the power transmission-switching device.

11. The exhaust heat recovery apparatus according to claim 1,
wherein the power transmission-switching device is a clutch.

12. An exhaust heat recovery apparatus comprising:
an exhaust heat recovery unit that produces motive power by recovering thermal energy from exhaust heat, wherein the exhaust heat recovery unit is configured to be coupled to a heat engine, and the produced motive power is combined with motive power produced by the heat engine and is output together therewith;
an auxiliary configured to be coupled to the exhaust heat recovery unit and the heat engine, and driven by at least the exhaust heat recovery unit;
a power transmission-switching device provided between the heat engine and the exhaust heat recovery unit and between the heat engine and the auxiliary, that decouples the heat engine from both the auxiliary and the exhaust heat recovery unit when a request to drive the heat engine falls below a predetermined level such that both the auxiliary and the exhaust heat recovery unit are isolated from the heat engine; and
a clutch control section connected to the power transmission-switching device that controls the power transmission-switching device;
wherein the exhaust heat recovery unit comprises a high temperature-side cylinder, a low temperature-side cylinder, and a heat exchanger including a heater, a regenerator, and a cooler, the heat exchanger being connected to both the high temperature-side cylinder and the low temperature-side cylinder.

13. The exhaust heat recovery apparatus according to claim 12,
wherein the auxiliary is configured to be driven by motive power from the exhaust heat recovery unit when the auxiliary and the exhaust heat recovery unit are decoupled from the heat engine.

14. The exhaust heat recovery apparatus according to claim 6,
wherein the heat storage unit is a mechanical unit.

15. The exhaust heat recovery apparatus according to claim 1,
wherein the exhaust heat recovery apparatus is for a vehicle and the power transmission switching device decouples the heat engine from the auxiliary when the vehicle is idling.

16. The exhaust heat recovery apparatus according to claim 12,
wherein the exhaust heat recovery apparatus is for a vehicle and the power transmission switching device decouples the heat engine from the auxiliary when the vehicle is idling.

17. The exhaust heat recovery apparatus according to claim 1, wherein the exhaust heat recovery unit is connected to the heat engine via the auxiliary; and
wherein the power transmission-switching device is a single power transmission-switching device located between the heat engine and the auxiliary.

18. The exhaust heat recovery apparatus according to claim 12, wherein the exhaust heat recovery unit is connected to the heat engine via the auxiliary; and
wherein the power transmission-switching device is a single power transmission switching device located between the heat engine and the auxiliary.

19. The exhaust heat recovery apparatus according to claim 1, wherein the heat engine is connected to a connection between the heat recovery unit and the auxiliary, and
wherein the power transmission-switching device is located between the heat engine and the connection between the heat recovery unit and the auxiliary.

20. The exhaust heat recovery apparatus according to claim 12, wherein the heat engine is connected to a connection between the heat recovery unit and the auxiliary, and
wherein the power transmission-switching device is located between the heat engine and the connection between the heat recovery unit and the auxiliary.

21. The exhaust heat recovery apparatus according to claim 1, wherein the request to drive the heat engine falls below the predetermined level when the request to drive the heat engine is zero.

22. The exhaust heat recovery apparatus according to claim 12, wherein the request to drive the heat engine falls below the predetermined level when the request to drive the heat engine is zero.

* * * * *